Patented Dec. 19, 1922.

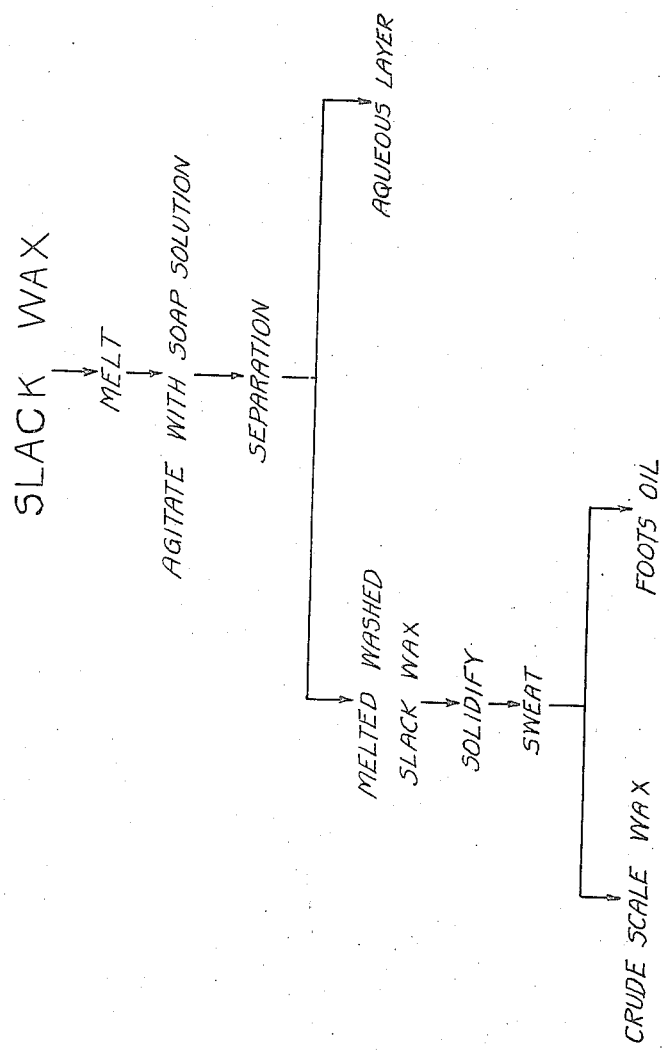

1,438,985

UNITED STATES PATENT OFFICE.

THOMAS G. DELBRIDGE, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

METHOD OF TREATING WAX.

Application filed May 10, 1919. Serial No. 296,244.

*To all whom it may concern:*

Be it known that I, THOMAS G. DELBRIDGE, a citizen of the United States, residing in the city and county of Philadelphia, State of Pennsylvania, have invented certain new and useful Improvements in Methods of Treating Wax, of which the following is a specification.

My invention relates to treatment of wax, as paraffine wax derived from mineral oil, and more particularly from wax bearing petroleum.

My invention resides in a method of treating wax, as paraffine wax, for improving its crystalline structure and color, for removing odor, and, in general, for removing therefrom associated impurities or foreign matter, including finely divided solids and solids in colloidal state.

My invention resides more particularly in a method of treating slack wax by washing it with suitable soap solution to improve its crystallizing properties, to impart to it better sweating properties, to improve its color, and to remove odor.

For an illustration of one of various modes of practicing my invention, reference may be had to the accompanying drawing, which is a chart of one mode of procedure embodying my invention.

In the separation of paraffine wax from petroleum a so-called wax bearing distillate obtained from the crude oil by distillation, with or without cracking, is chilled to a suitable temperature and the solid paraffine wax, which consists of crystals ranging in size upwardly from microscopic to well-developed individuals, is separated from the oil as by filter press. The resulting semi-solid product, generally known as slack wax, remaining on the filtering medium, is a mixture, roughly, of 50% wax and 50% oil. For the further removal of the oil the slack wax is subjected to a sweating process by means of which the oil is caused to exude from the voids or interstices between the individual crystals, leaving a practically oil-free paraffine wax usually known as crude scale wax. In order to obtain the most rapid and complete separation of oil from the paraffine wax crystals, it is essential that these crystals be fairly large and well-formed and of substantially uniform size. It is therefore desirable that the slack wax to be sweated be as free as possible of microscopic or fragmentary crystals, and formation of these is avoided by the practice of my invention.

In accordance with my invention the slack wax is melted, in batches of any suitable size, for example 4000 barrels, and while maintained at suitable temperature, as for example, 180 degrees F., the melted mass is agitated in any suitable way, as by blowing air therethrough, in the presence of an aqueous solution of suitable soap.

For the purpose described I have employed so-called "milk water" soaps, namely, alkali metal and ammonium salts of organic, as sulfonic, acids found in sour oil, that is, in the oil separated from acid sludge after treatment of an oil, as a petroleum stock or distillate, by strong sulphuric acid, for example, 66 degrees Bé. or stronger, including fuming sulphuric acid. When such a sour oil is neutralized, as by sodium hydroxide or equivalent, the organic, as sulfonic, acids in the oil are neutralized by the reagent, forming soaps which remain in the milk water or aqueous layer when the agitated and neutralized sour oil is allowed to stand and separate into a layer of oil upon an aqueous layer. Or, otherwise stated, these soaps are those of organic acids which are found in the sour oil, as distinguished from those found in the acid sludge, resulting from acid treatment of the petroleum stock or distillate.

Resin soaps, naphthenic soaps, fatty acid soaps, alkali metal or ammonium soaps of organic, as sulfonic, acids found in acid sludge resulting from acid treatment of oil, or any other suitable soap, may be employed, or mixtures of any of the soaps herein described.

The soap solution causes transfer or migration from the melted mass into the water of finely divided solids, as those in colloidal state, and foreign matter in general, which heretofore have prevented the improvement in color, crystalline structure and sweating properties of wax of this character.

The agitation is discontinued after suitable length of time, whereupon the mixture separates into a lower aqueous layer, containing the soap and foreign or colloidal matter removed from the wax, and a supernatant layer of melted washed slack wax which is drawn off and pumped to sweating pans, where it is allowed to solidify. The contained oil is then sweated out by suitably controlling the temperature of the solidified mass, as well understood in the art. The result of the sweating action is the separation of oil, as foots oil, leaving crude paraffine wax of improved qualities and properties.

Melted slack wax which has been subjected to the washing or treatment above described solidified with the formation of crystals which are larger and more uniform in size than in the case of prior practice.

As a result of this improved physical structure of the solidified slack wax the oil contained therein is more easily and more quickly sweated out or separated.

The wax has also an improved color, has less odor, and is readily refined, by any well known method of treating crude scale wax, to produce a finished wax of improved quality.

The quantity of soap and the water dilution of the soap solution are such that substantial emulsification of melted wax and oil does not take place, the quantity of soap preferably being relatively small, though sufficient to "wet" the solids or foreign matter to be removed from the wax and produce such interfacial tension relations that the soap and the solids pass into the water. The quantities of soap and water may be predetermined on a sample of the wax or slack wax to be washed.

By way of example merely, and without limiting myself to this procedure, I may carry out my invention as follows: To 4000 barrels of slack wax, heated to a suitable temperature, as for example 180 degrees F., I add a suitable quantity, as for example 1500 barrels, of an aqueous solution containing suitable quantities of soap or soaps and water as above described, as for example, 45 barrels of milk water soap. The aqueous solution accordingly contains soap to the extent of about one per cent, milk water soap commonly comprising from approximately thirty per cent to approximately fifty per cent soap yielding an aqueous solution of about one per cent soap. The soap solution is preferably previously heated to substantially the same temperature as the slack wax to be washed or treated. I then agitate this mixture of slack wax and aqueous soap solution by any suitable means, as by air, for a period of time, as for example four hours, such that a test sample withdrawn from the large batch will, upon standing while maintained at say 180 degrees F., separate rapidly and completely, as for example in fifteen minutes, into an upper layer of transparent molten slack wax and a lower milky, aqueous layer with a sharply defined line of separation. If the test sample does not separate in this manner, agitation of the large batch is continued as before for such a period of time as is necessary to secure the desired rapid and sharp separation. When this point is reached, agitation is discontinued, and the mixture allowed to settle for a suitable length of time, as for six hours, whereupon the slack wax is obtained in a greatly improved condition as to color, odor, and particularly as to crystalline structure.

What I claim is:

1. The method of improving the crystalline structure of wax, as paraffine wax, which comprises melting the same, while melted washing the mass with a soap solution of such concentration and under such conditions as to produce upon cooling wax substantially free of foreign colloidal solids and whose crystals are larger and more uniform in size.

2. The method of improving the crystalline structure of wax, as paraffine wax, which comprises melting the same, while melted washing the mass with aqueous soap solution of such concentration as to prevent substantial emulsification of the wax and to produce upon cooling a wax substantially free of foreign colloidal solids and whose crystals are larger and more uniform in size.

3. The method of treating slack wax, which comprises washing the same in fluid state with an aqueous solution of soap, separating the washed slack wax from the accompanying aqueous mass, and separating the oil from the washed slack wax.

4. The method of treating slack wax, which comprises washing the same in fluid state with an aqueous solution of soap, separating and solidifying the washed slack wax, and sweating oil therefrom.

5. The method of treating slack wax, which comprises washing the same in fluid state with a soap solution of such concentration as to prevent substantial emulsification and to produce upon cooling a slack wax whose wax component comprises crystals of increased size, whereby the wax and oil may thereafter be more readily separated.

6. The method of treating wax, as paraffine wax, which consists in washing the same in the fluid state with an aqueous solution of soaps of organic acids resulting from the treatment of petroleum by strong sulphuric acid.

7. The method of treating wax as paraffine wax which consists in washing the same in the fluid state with an aqueous solution of soaps of oil soluble organic acids resulting from the treatment of petroleum by strong sulphuric acid.

8. The method of treating slack wax, which consists in washing the same in the liquid state with an aqueous solution of "milk water" soap.

9. The method of improving the crystalline structure of paraffine wax, which consists in washing the same in the fluid state with an aqueous solution of about one per cent soap.

10. The method of treating slack wax, which consists in melting the same and maintaining the oil and paraffine wax in mixture, and washing the mixture with an aqueous solution of about one per cent soap.

In testimony whereof I have hereunto affixed my signature this 8th day of May, 1919.

THOMAS G. DELBRIDGE.